United States Patent [19]

Symer et al.

[11] 3,739,223

[45] June 12, 1973

[54] VOLTAGE-ON-DEMAND DEFLECTION AMPLIFIER

[75] Inventors: Orten Henry Symer, Wantagh; Winfield Scott Bearce, Commack, both of N.Y.

[73] Assignee: Orwin Associates Inc., West Babylon, N.Y.

[22] Filed: Mar. 30, 1970

[21] Appl. No.: 23,741

[52] U.S. Cl. .......... 315/27 TD
[51] Int. Cl. .......... H01j 29/70
[58] Field of Search .......... 315/27 TD

[56] References Cited

UNITED STATES PATENTS 3,426,241 2/1969 Perkins .......... 315/27 TD
3,155,873 11/1964 Paschal .......... 315/27 TD

*Primary Examiner*—Benjamin A. Borchelt
*Assistant Examiner*—S. C. Buczinski
*Attorney*—James J. Trainor

[57] ABSTRACT

A deflection amplifier which provides a boost voltage required for fast magnetic deflection of a cathode ray tube electron beam while affording means for maintaining a continuous closed feedback loop around the deflection yoke and the driver amplifier.

3 Claims, 3 Drawing Figures

INVENTORS
ORTEN HENRY SYMER
WINFIELD SCOTT BEARCE

INVENTORS
ORTEN HENRY SYMER
WINFIELD SCOTT BEARCE

VOLTAGE-ON-DEMAND DEFLECTION AMPLIFIER

BACKGROUND OF THE INVENTION

1. Field of Use

This invention relates to electron beam deflection amplifiers, and more particularly, to such amplifiers utilizing transistors as the active components and employing a voltage on demand boost coil.

2. Description of the Prior Art

Transistor deflection amplifiers for driving an inductive coil or yoke associated with a cathode ray tube, so as to cause the cathode ray tube electron beam to move to a new position on the cathode ray tube screen, are well known in the prior art.

One such type of voltage on demand amplifier is illustrated in FIG. 1. In this circuit negative drive transistor 10 and positive drive transistor 11 are biased at cathode ray tube center with substantially equal currents 12 and 13 summed through boost coil 14 to make current 15. In normal operation for low speed electron beam positioning, current 15 is substantially constant, as in any typical push-pull circuit. Although energy is stored in coil 14 during the constant current operation, no voltage is induced across coil 14. When a relatively fast negative positioning signal is impressed on the circuit, the induced voltage across coil 16, one-half of the deflection yoke, saturates transistor 10 thereby limiting its on-going current change rate. On the other hand transistor 11 can turn off as fast as the input signal rate of change. Therefore, current 15 will tend to decrease during this transient condition causing the voltage at 17 to swing positive due to the induced voltage on boost coil 14. This effectively increases the voltage across yoke 16, 18 and, in turn, the current rate change required to saturate the amplifier stage.

After the positioning of the electron beam is accomplished, current 15 tends to settle back to its initial steady state value, however, since coil 14 will not accept an instantaneous current change it kicks negative so that the voltage at 17 is clamped by diodes 19 and 20 at some negative voltage. The negative voltage at 17 remains until current 15 returns to its steady state value.

The system described above has several disadvantages. The feedback signals being obtained from the emitter currents of transistors 10 and 11 and not the actual yoke current, nonlinearities are introduced into the system. These nonlinerities result from phase shift due to damping resistor loading, driver transistor output capacitance and transistor current gain operating point shift. These drawbacks have resulted in poor performance when using this type of circuit in systems that must respond to relatively high speed deflection signals.

FIG. 2 illustrates a simplified schematic diagram of a somewhat similar voltage on demand technique to that described in connection with FIG. 1 except that in this circuit the feedback signal is a true sampling of the actual yoke current which eliminates some of the nonlinearity problems associated with the circuit of FIG. 1. This system, which functions in the same manner as the circuit of FIG. 1, has one serious disadvantage not discussed in connection with the circuit of FIG. 1. In this circuit when the boost coil, which is divided into two halves, coils 21 and 22, flies back as a result of the boost coil current tending to return to its steady state, the voltage at 23 and 24 must be clamped by diodes 25, 26 and 27 to prevent transistors 27 and 28 from saturating. During this recovery time the feedback signals are essentially shunted by diodes 25, 26 and 27 thereby rendering any feedback around the driver amplifier inoperative during recovery and nullifying any advantage to be derived from boost coil 21–22. In addition, the stray capacitance and inductance of the boost coil within the deflection amplifier closed loop will degrade the band width of the amplifier.

It is an object of this invention therefore, to provide a new and improved voltage-on-demand deflection amplifier which obviates one or more of the above mentioned disadvantages of the prior art devices.

It is another object of the invention to provide a new and improved voltage-on-demand deflection amplifier capable of responding satisfactorily to relatively high speed input positioning signals without becoming open loop.

SUMMARY OF THE INVENTION

In accordance with the invention there is provided a voltage-on-demand deflection amplifier for deflecting an electron beam by means of an inductive yoke comprising a differential amplifier to which input signals may be applied; a push pull driver amplifier; means for applying an isolated bias voltage to the push-pull amplifier; means for isolating the output signals of the differential amplifier and applying them as inputs to the push-pull amplifier; means for connecting a boost coil to the return of the push-pull amplifier; means for detecting the current flowing through the yoke; means for connecting the yoke between the output of the push-pull amplifier and the detecting means; and a feedback path coupling the outputs of the detecting means to the inputs of the differential amplifier.

For a better understanding of the present invention together with further objects and features thereof, reference is had to the following detailed description, to be read in conjunction with the accompanying drawings.

DESCRIPTION OF THE PREFERRED EMBODIMENT

Figure 3:
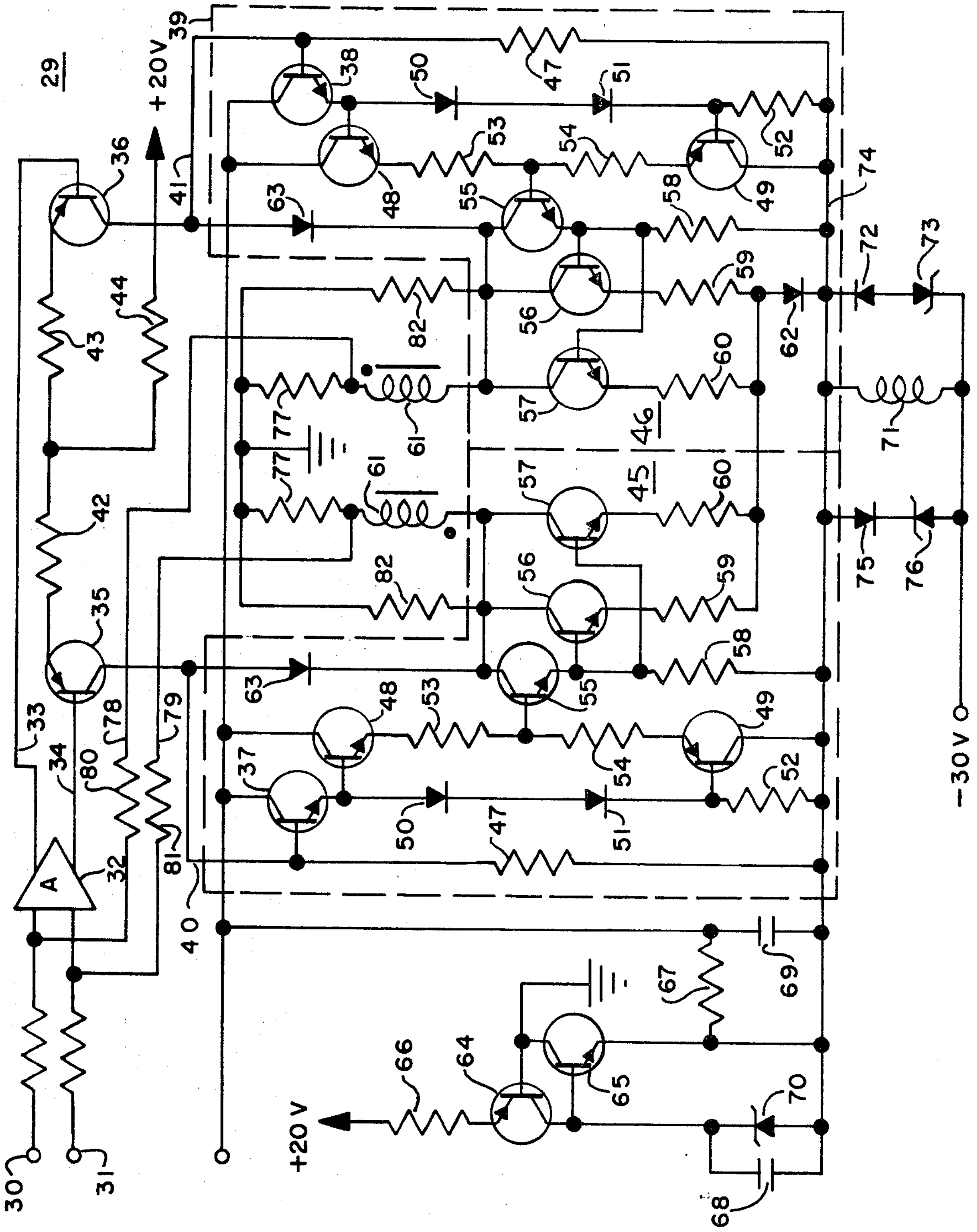
FIG. 3 is a schematic representation of a voltage-on-demand deflection amplifier embodying the present invention.

Referring now to FIG. 3 of the drawings, there is shown a schematic representation of the voltage-on-demand deflection amplifier embodying the principals of the present invention.

The input position signals to deflection amplifier 29 are applied to input terminals 30 and 31 of differential amplifier 32. Amplifier 32 amplifies the input signals and couples them by means of conductors 33 and 34 to the bases of transistors 35 and 36. The outputs, that is, the collectors of transistors 35 and 36 are connected respectively to the bases of transistors 37 and 38, which are the inputs of push-pull amplifier 39, by means of conductors 40 and 41.

Transistors 35 and 36 together with resistors 42, 43 and 44 comprise means for isolating the output signals of amplifier 32, that is, the signals on conductors 33 and 34 from power ground.

It should be noted that in the use of the word "isolating" or any form of this term, throughout this application, it is meant isolation of the applicable component or circuit or part thereof from ground potential so that such component or circuit may be considered to be floating with respect to ground.

As will be explained hereinafter, push-pull amplifier 39 is isolated from power ground and to maintain this condition all inputs to amplifier 39 must also be isolated.

The emitters of transistors 35 and 36 are connected respectively to one end of resistors 42 and 43. The other end of resistors 42 and 43 are connected together with one end of resistor 44 to form a single connection. The other end of resistor 44 is connected to a −30 volt direct current power supply.

Push-pull amplifier 39 is composed of two identical symmetrical circuits 45 and 46. Therefore, for purposes of this explanation, the corresponding components of each circuit have been assigned the same reference numerals.

Referring again to FIG. 3, transistors 37 and 38 provide high input impedances so that the current driven differential signals on conductors 40 and 41 develope voltages across precision resistors 47 which are dependent primarily on the value of such resistors. The outputs of transistors 37 and 38, are coupled to the inputs of complimentary emitter followers comprised of transistors 48 and 49 which are prebiased by means of diodes 50 and 51 and resistor 52. One end of resistors 53 and 54 are connected respectively to the emitters of transistors 48 and 49. The other end of resistors 53 and 54 are connected together and, in turn, connected to the base of transistors 55. Transistors 55, 56 and 57 are connected in a Darlington arrangement with transistors 56 and 57 sharing the heavy current and power. Transistors 55 are connected so as to insure that any currents lost to the bases of transistors 56 and 57 at high frequencies are returned to yoke 61. Resistors 58, 59 and 60 are connected respectively to the emitters of transistors 55, 56 and 57. Diode 62 provides additional bias to transistors 56 and 57 to allow for easier cutoff. Diode 63 limits the voltage across transistors 37, 48 and 55 to a minimum so that they cannot saturate during a fast transient.

Transistor 64 and 65 form part of the means for applying an isolated bias voltage to transistors 37, 38 and 48 of push-pull amplifier 39. Transistor 64 and resistor 66 comprise the constant current portion of the isolated bias voltage supply while transistor 65, resistor 67, capacitors 68 and 69 and zener diode 70 form the voltage regulator portion of such supply.

The isolated bias voltage supply is required to keep the high voltage transients from effecting the voltage on resistors 47 through the base-to-collector capacitance of transistors 37 and 38.

Figure 1:
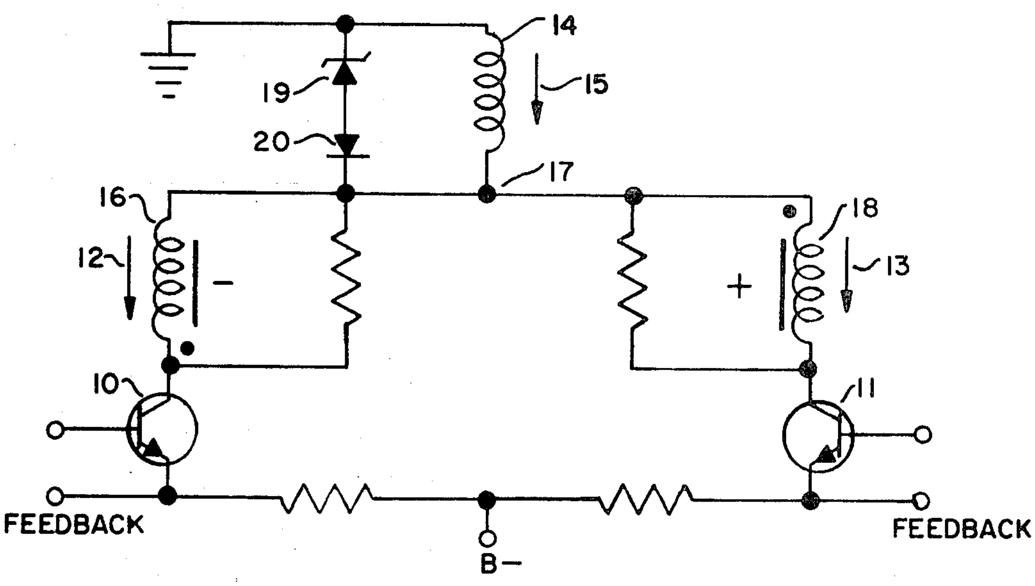
FIG. 1 is a simplified schematic representation of a prior art voltage-on-demand deflection amplifier utilizing emitter feedback.
Figure 2:
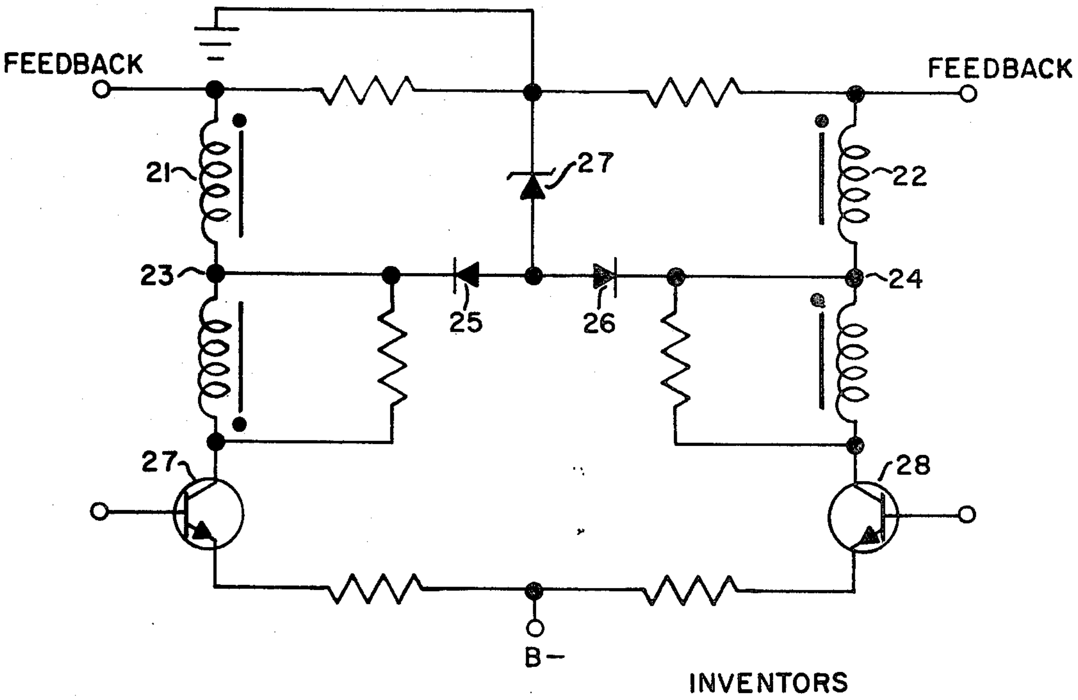
FIG. 2 is a simplified schematic representation of a prior art voltage-on-demand deflection amplifier utilizing post yoke sampling.

Boost coil 71, which is connected between the common return of push-pull amplifier 39 and a negative 30 volt direct current supply, functions in the circuit of the present invention in essentially the same manner as the boost coil 14 of FIG. 1.

Diode 72 and zener diode 73 comprise a voltage limit circuit which prevents the voltage on conductor 74 from going below a negative 140 volts and diode 75 and zener diode 76 prevent the voltage on conductor 74 from going above a negative 20 volts when the current through boost coil 71 first begins to recover its steady state value after a transient input signal. Both the above circuits limit the voltage swings across boost coil 71.

Resistors 77 comprise means for detecting the current flowing through deflection yoke 61. Yoke 61 is interconnected between the outputs of push-pull amplifier 39, that is, the collectors of transistors 55, 56 and 57, and one side of resistors 77. The other side of resistors 77 are connected to power ground.

A feedback path coupling the outputs of the yoke current detecting means, that is, the yoke 61 side of resistors 77, and input terminals 30 and 31 of differential amplifier 32 comprises conductors 78 and 79 and resistors 80 and 81.

Resistors 82 are damping resistors. The value of these resistors is chosen so as to allow for critical damping of the circuit.

Summarizing the operating principals of this embodiment of the present invention, feedback signals are derived from the current detecting resistors 77 which are in series with deflection yoke 61. Resistors 77 and differential amplifier 32 both being referenced to ground permits stable closed loop operation of the circuit.

As was described in reference to the prior art circuit of FIG. 1, in a steady state condition the currents through both halves of push-pull amplifier 39 is such that their sum is a constant. This, of course, is typical for any class A push-pull amplifier. This constant current is also conducted through boost coil 71, during which time coil 71 is storing energy, however, as there is no change in current no voltage is induced across coil 71. Therefore, conductor 74 is essentially at the −30 volt potential. When a signal is coupled through the circuit to push-pull amplifier 39, the nature of the illustrated circuit configuration is to maintain a constant total current while the differential current is a function of the signal inputs to differential amplifier 32.

As long as the current conducted through boost coil 71 is constant, there will be no induced voltage in coil 71. However, if the rate of change of the signal to amplifier 32 is such that the current through the on-going half of push-pull amplifier 39 cannot increase fast enough to compensate for the decrease in current caused by the off-going half of push-pull amplifier 39, the current through boost coil 71 will decrease causing a negative induced voltage to be applied to conductor 74.

It should be noted that the circuit configuration of the present invention prevents the on-going driver stage from saturating. To allow saturation would defeat the purpose of the whole circuit in that an open loop condition would be allowed. In addition, saturation of the driver stage would cause the saturated transistors to build up a storage charge, the discharge of which would increase the total transient recovery time.

When conductor 74 is driven negative by boost coil 71, the emitter circuitry of transistors 56 and 57 are also pulled negative through diode 62 thereby making a much greater voltage available to keep the on-going transistors from saturating.

The off-going transistors, in addition to having the increased negative voltage induced by boost coil 71, applied to their emitter circuits, have a positive voltage on their collectors due both to the reduction of current on the off-going side and to the induced voltage coupling through yoke 61 by the increasing current through the on-going driver stage. Because of this action greater than normal collector to emitter voltages are impressed across the off-going driver transistors. Therefore, the maximum allowable voltages for transistors 56 and 57 sets the limit to the maximum boost voltage which can be tolerated for a given circuit configuration.

The input signals are coupled from the outputs of differential amplifier 32 through precision resistors 47 by means of current driver transistors 35 and 36 which isolate these signals from ground. The signals then pass through high input impedance transistor 37 and 38 to complimentry emitter follower transistors 48 and 49 which are prebiased by diodes 50 and 51 to present a low output impedance. The outputs of transistors 48 and 49 are then presented to transistors 55, 56 and 57 which are in a Darlington configuration and which form the driver stages of push-pull amplifier 39.

The differential deflection signals across resistors 47 are referenced at one end to conductor 74. During normal unboosted operation, that is, when the current through boost coil 71 is constant, the potential at the base of transistors 37 and 38 is more negative than that on the collectors of transistors 55, 56 and 57, which constitute their respective output drivers. Therefore, diodes 63 are back baised. However, when the differential input signal is such that the current through coil 71 is changed such that the collectors of transistors 55, 56 and 57 are pulled more negative than the base of transistors 37 and 38, diodes 63 will be forward biased and will limit the voltage on the base of transistors 37 and 38. This action causes the currents in the associated output driver transistors 55, 56 and 57 to be limited. This is a form of feedback limiting which prevents the driver stages from saturating.

Each boost function removes some of the stored energy from the boost coil, which energy must be replaced. This replacement of energy takes place when the total current through boost coil 71 recovers to its original steady state value. However, when the current starts to increase toward its constant steady state value, a positive voltage appears on conductor 74. This positive swing of conductor 74 must be limited in amplitude to avoid saturation of the driver stages of push-pull amplifier 39. In addition, if the positive swing of conductor 74 were not limited, the voltage required for the driver amplifier to follow normal differential input signals would be unavailable. However, since the fastest coil 71 recovery time is achieved with the highest backswing positive voltage on conductor 74, a tradeoff must be made. Thus, the positive voltage swing of conductor 74, which is limited by diode 75 and zener diode 76, and which effect a substantially low resistance shunt across boost coil 71 during its recovery, is such that push-pull amplifier 39 can function under normal, non-transient electron beam positioning operation, while maintaining an acceptable increase in boost coil 71 recovery time.

In the illustrated configuration, the current differential is provided during fast transient input signals when the on-going stage is limited by diode 63 and the off-going stage proceeds more rapidly. This change in current causes boost coil 71 to kick negative providing more voltage capability across the on-going driver stage until the L ($di/dt$) of the on-going stage equals the L ($di/dt$) of the off-going stage less the current differential necessary to induce voltage upon boost coil 71. In the illustrated circuit boost coil 71 has 16 times the inductance (L) of yoke 61 (that portion of the total yoke 61 inductance located in the respective driver collector circuits) plus the mutual inductance between the two halves of yoke 61. In addition, the voltage induced by coil 71 is only 110 volts, that is, 140 volts minus the 30 volt supply for 130 volts, that is, 140 volts minus a 10 volt circuit voltage drop, of yoke 61 induced volts. Therefore, the current change required equals $110/130 \times 1/16 = 5.3\%$ of the deflection circuit transient current.

It is believed that the operation of the above-described illustrative embodiment of the invention will be apparent from the foregoing description. While the circuit has been described as being suitable for deflecting electron beams, it will be obvious that various changes and modifications may be made therein without departing from the spirit and scope of the invention.

What is claimed is:

1. For deflecting an electron beam by means of an inductive yoke, a voltage-on-demand deflection amplifier comprising:
- a differential amplifier to which input signals may be applied;
- a push-pull driver amplifier;
- means for applying an isolated bias voltage to said push-pull amplifier;
- means for isolating the output signals of said differential amplifier and applying them as inputs to said push-pull amplifier;
- means for connecting a boost coil to the return of said push-pull amplifier;
- means for providing a substantially low resistance shunt across said boost coil during its recovery;
- means for detecting the current flowing through the yoke;
- means for connecting the yoke between the output of said push-pull amplifier and the detecting means; and
- a feedback path coupling the outputs of the detecting means to the inputs of the differential amplifier.

2. The voltage-on-demand deflection amplifier in accordance with claim 1 wherein said differential amplifier is an operational amplifier.

3. For deflecting an electron beam by means of an inductive yoke, a voltage-on-demand deflection amplifier comprising:
- a differential amplifier to which input signals may be applied;
- a push-pull driver amplifier having two symmetrical stages each of which comprises:
  - a high input impedance stage;
  - a complementary emitter follower stage; and
  - a driver stage having a Darlington configuration;
- means for applying an isolated bias voltage to said push-pull amplifier;
- means for isolating the output signals of said differential amplifier and applying them as inputs to said push-pull amplifier;
- means for detecting the current flowing through the yoke;
- means for connecting the yoke between the output of said push-pull amplifier and the detecting means; and
- a feedback path coupling the outputs of the detecting means to the inputs of the differential amplifier.

* * * * *